(12) United States Patent
Nath et al.

(10) Patent No.: US 9,197,632 B2
(45) Date of Patent: Nov. 24, 2015

(54) SYSTEM AND METHOD FOR ACCOUNT ACCESS

(71) Applicant: Kaarya LLC, Torrance, CA (US)

(72) Inventors: Ujjual Nath, Manhattan Beach, CA (US); Gaurav Sharma, Irvine, CA (US); William Fletcher, Carson City, NV (US)

(73) Assignee: Kaarya LLC, Signal Hill, CA (US)

( * ) Notice: Subject to any disclaimer, the term of this patent is extended or adjusted under 35 U.S.C. 154(b) by 65 days.

(21) Appl. No.: 14/216,795

(22) Filed: Mar. 17, 2014

(65) Prior Publication Data

US 2014/0282949 A1 Sep. 18, 2014

Related U.S. Application Data

(60) Provisional application No. 61/801,485, filed on Mar. 15, 2013.

(51) Int. Cl.
| | | |
|---|---|---|
| H04L 29/06 | (2006.01) | |
| G06F 21/00 | (2013.01) | |
| G06F 21/31 | (2013.01) | |

(52) U.S. Cl.
CPC .............. *H04L 63/083* (2013.01); *G06F 21/31* (2013.01); *G06F 2221/2103* (2013.01); *G06F 2221/2131* (2013.01); *G06F 2221/2133* (2013.01); *H04L 63/062* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 5,483,586 | A * | 1/1996 | Sussman | 379/218.01 |
| 5,655,077 | A | 8/1997 | Jones et al. | |
| 5,727,163 | A | 3/1998 | Bezos | |
| 5,960,411 | A | 9/1999 | Hartman et al. | |
| 7,076,795 | B2 | 7/2006 | Hahn | |
| 8,224,873 | B1 * | 7/2012 | Korablev et al. | 707/809 |
| 2003/0144989 | A1 * | 7/2003 | Schoemann | 707/1 |
| 2004/0193925 | A1 | 9/2004 | Safriel | |
| 2009/0144619 | A1 * | 6/2009 | Best et al. | 715/277 |
| 2011/0167059 | A1 * | 7/2011 | Fallah | 707/723 |
| 2013/0145145 | A1 * | 6/2013 | Dittmer-Roche | 713/153 |
| 2014/0229404 | A1 * | 8/2014 | Kohl et al. | 705/36 R |

OTHER PUBLICATIONS

Florencio, Dinei "A Large-Scale Study of Web Password Habits", Proceedings WWW 2007, Banff, BC, Canada.

* cited by examiner

*Primary Examiner* — Lisa Lewis
(74) *Attorney, Agent, or Firm* — Brian Billett

(57) ABSTRACT

The longstanding problems of user password management and security, and user authentication are addressed. Disclosed is a system and method for providing a means for a user to identify themselves with configurable levels of authentication in order to receive limited access or services while protecting user privacy. As a user inputs information related to their identity into an interface, the system searches an indexed database which may include both registered users and/or unregistered customers indexed from disparate data sources. The system presents the user matching results from the search in an obscured form from which the user selects and authenticates his or her identity. Unregistered users identified during the process may be automatically registered in certain embodiments, or no account may be needed in other embodiments.

20 Claims, 10 Drawing Sheets

SYSTEM AND METHOD FOR ACCOUNT ACCESS

RELATED APPLICATIONS

This application for patent claims the benefit of provisional application 61/801,485 filed on Mar. 15, 2013.

FIELD OF THE INVENTION

The present invention generally relates to the field of identity authentication, specifically the authentication of users for online and other application account access and registration.

BACKGROUND OF THE INVENTION

The identification and authentication of users by a combination of a username or username and password (or knowledge) has been a consistent aspect of multi-user computing systems since at least the early 1960's. This likely original use was to identify and authenticate system users and the amount of expensive computation time used on these shared systems. Ironically, it has been reported that one of these original users also hacked the password authentication on these early systems to steal computing resources for his graduate school project.

Nearly 50 years later, although implemented with a variety of cryptography technologies and for an increasingly wide variety of applications, the user experience has remained the same, or worsened. Unlike in 1962, today's users have a multitude of accounts and passwords to remember. According to a large scale study done by Microsoft in 2007, within the controlled group of users, the average user accessed roughly 25 different systems online which require passwords. The study reported that the average number of actual distinct passwords used by the participants was 6.5, however, across only 3.9 sites each. Average participant users each typed on average 8 passwords every day. Other studies report both higher numbers of average accounts and lower numbers of user-generated passwords.

Already overwhelmed by the mental gymnastics that mere routine online usage was asking of them, the burden appears to be unbounded. Web account and resource users are increasingly asked or required to use more complex passwords, with restrictions such as a minimum length, a combinations of letters, numbers, non-alphanumeric characters, and/or a mix of upper and lower case characters.

In order to cope with this increasingly daunting memorization task, users have developed various strategies, from keeping lists of passwords, or using just one or two easily memorized passwords, to the liberal use of post-it notes attached to their monitor.

The typical user password memory assistance strategies such as 1) repeated user entry of a password during the day, perhaps from multiple locations, 2) the usage of a password for multiple authentications, and 3) the physically vulnerable use of password lists and post-it notes in shared office space, each pose security risks. For example, the more times and locations a user is required to enter passwords during the day, the more frequently they become vulnerable to attacks such as malicious key-logging Trojans, password phishing, or man-in-the-middle attacks over shared or wireless networks, among many others. And when users access multiple secure sites using the same password, a stolen password for one site is stolen for all of them.

Real world examples of password security breaches and malicious password threats are everywhere. In a single notorious password data breach in 2007, on Rockstar.com, a gaming site, 32 million user passwords were stolen and posted online publically the same day. Another style of attack, phishing, where the attacker impersonates a known web site or entity identity known to the target, seems to be proliferating virtually unabated, despite well publicized warnings. According to Fraudwatch International, between just Feb. 15 and Mar. 15 of 2013, no less than 25 widespread online banking password phishing attacks were launched, with the attackers posing as major international banks. In an elaborate attack on PayPal users, the website address and even security certificate were spoofed for the fake site, and many users unsuspectingly entered their credentials into the spoofed interface.

Of course these problems are well known and considerable efforts have been made to improve either the username/password authentication model, or the technical implementation security. Technical improvements in cryptography have improved the ability to withstand brute force attacks, and the use of certificate authorities has made phishing attacks and man-in-the middle attacks more difficult. Unfortunately, few solutions have been adopted to address the high volume of passwords and use of repeated passwords as they are generally more cumbersome for users. Thus the convenience for the user must be considered carefully when developing identity authentication methods.

The common (special) case where a user wants to securely access web sites from a single, private, presumably secure computer, has presented an opportunity for new technical solutions. One solution utilizes browser cookies and tokenized credentials for users. When users return to these web sites which they have already provided credentials to access, they have the option to not use any credentials for the repeat access, see U.S. Pat. No. 5,727,163 Weiss. An extension of this solution for placing merchant orders online by the so-called 1-click ordering, see U.S. Pat. No. 5,960,411 Hartman, et. al. Such credentials could be reasonably kept secret from other users of the computer system by cryptographic tokens however, the user must be logged out of the secure site to preserve any privacy or security. Thus these methods still rely upon the still highly problematic username/password credential model. Also, although unusual, but perhaps not for long, attacks on SSL cryptography, including decrypting these credential tokens, has been documented in the literature.

Another technical innovation, which assists users in managing the complex use of passwords is known as a password key-ring, or password manager. This utility is a software application and database that store encrypted and tokenized information corresponding to a user's passwords and associated resources which are to be authenticated, U.S. Pat. No. 5,655,077 Jones, et. al. U.S. Pat. No. 7,076,095 Hahn, US Appl. 2004/0193925 Safriel, and Roboform from Siber Systems (www.roboform.com). Although useful, these solutions utilize complex implementations, require diligence by the user to incorporate infrequently visited secure online resources, and remain vulnerable to a number of attacks such as malicious Trojan key-loggers.

Not all online resources necessitate the same level of security or privacy. This provides an opportunity for innovative solutions which are currently undeveloped. At present, no system or method is available that utilize the wide variations in online resource privacy needs in order to provide a user identified access without the use of any explicitly entered, tokenized or otherwise transmitted password or other unique authentication factor (biometric, smartcard, etc.).

SUMMARY OF THE INVENTION

The current invention departs in several fundamental ways from the above and other currently available methods for user identification, authenticated login and account registration. Embodiments of the current invention are specifically designed for online resources and application functions which have minimal or no privacy concerns, but are extendable to a range of privacy and security levels. One basic implementation of the current invention is coined "the no password login."

In an exemplary embodiment, no local browser cookie or other locally stored user information is needed to confirm a user's identity. Instead, the identification is provided entirely by user recall and selection of the identified correct account while entering user recalled personal information. The online application utilized for identification/authentication searches the secure server database of registered users, which is in real time to make the process even more natural and immediate for users. No traditional username or password is needed for basic access. Generally, just a few keystrokes need to be typed, until a sufficiently low number of choices are presented that the identification may be selected by the user. Also, to maintain privacy during the process, identification choices are presented to the user in a highly redacted format. Once basic access is granted, no information is sent or shared by the system (through the application interface) unless further authenticated for release. Account feedback and confirmation are sent by email.

Among many of the utilities of the current invention, the ubiquitous task for retrieving forgotten passwords, which consists of first authenticating a user ID via email, then resetting the password, and finally interacting with secure user services is no longer needed. Instead password retrieval (for access to more secure resources than are available at the basic level) is reduced to: the user request, and the confirmation/authentication email response.

In accordance with the present invention, the problem of providing an extremely simple and secure method for users to login to secure applications to perform tasks with minimal or no privacy concerns is solved by partitioning privacy levels of access such that a minimum of keystrokes provides access to a basic service level for the identified and authenticated user, without compromising user privacy. The basic level of account access to services is identified and authenticated by a predictive search of user records based on information input by the user with minimum recall effort. As the information is entered by the user, a real-time search of records is performed by the web application and the user is presented choices from a group of potential records. At the basic access level, these choices reveal only a self-identifiable obscured version of personal information. Once self-identified, the user is considered authenticated for this basic level. The user can only perform those tasks which do not compromise security or reveal un-redacted personal or other private information.

Other embodiments of the invention can be extended to multiple levels of user access depending on the sensitivity of the information and privacy concerns inherent in the use of the online resources. The dimension of secure access coincides with two dynamic and configurable user input query dimensions, the complexity or secrecy of the required identification information input by the user, and the number of identification challenge-response pairings. Such dimensions are configurable by either the resource administration according to their information security concerns, or by the users themselves according to their privacy concerns.

In other embodiments, customer identification information is compiled and indexed from disparate available resources in addition to previously registered users for an account. During real-time searching for user identification, unregistered customers are also identified. In various embodiments, identified customers are automatically registered to an account, and assigned credentials. In various embodiments auto-registered new account users are notified of the new account registration and provided immediate access limited initially to an assigned privacy level. In other embodiments, no account is created, but the identified user is allowed to perform certain functions.

DETAILED DESCRIPTION OF THE INVENTION

In an exemplary embodiment of the invention, an online application for scheduling service appointments is used for identifying a registered user and rapidly scheduling a service appointment with just a few strokes from a user, and without requiring the use of a traditional username and password. The process reveals no sensitive or personal information to the identified user while using this level of authentication. The process may be securely performed from any device since at no time does the user enter his or her username or password credentials, and neither are stored or transmitted in clear text, encrypted or token form.

In this embodiment, two levels of authentication are implemented for identified/authenticated users. At the basic level, users may identify themselves by entering the beginning portion of virtually any personal information into the "find yourself" or "instant access" field. In this embodiment the secondary, or higher level of user access requires a traditional username and password to be entered by the user for such access.

Figure 6:
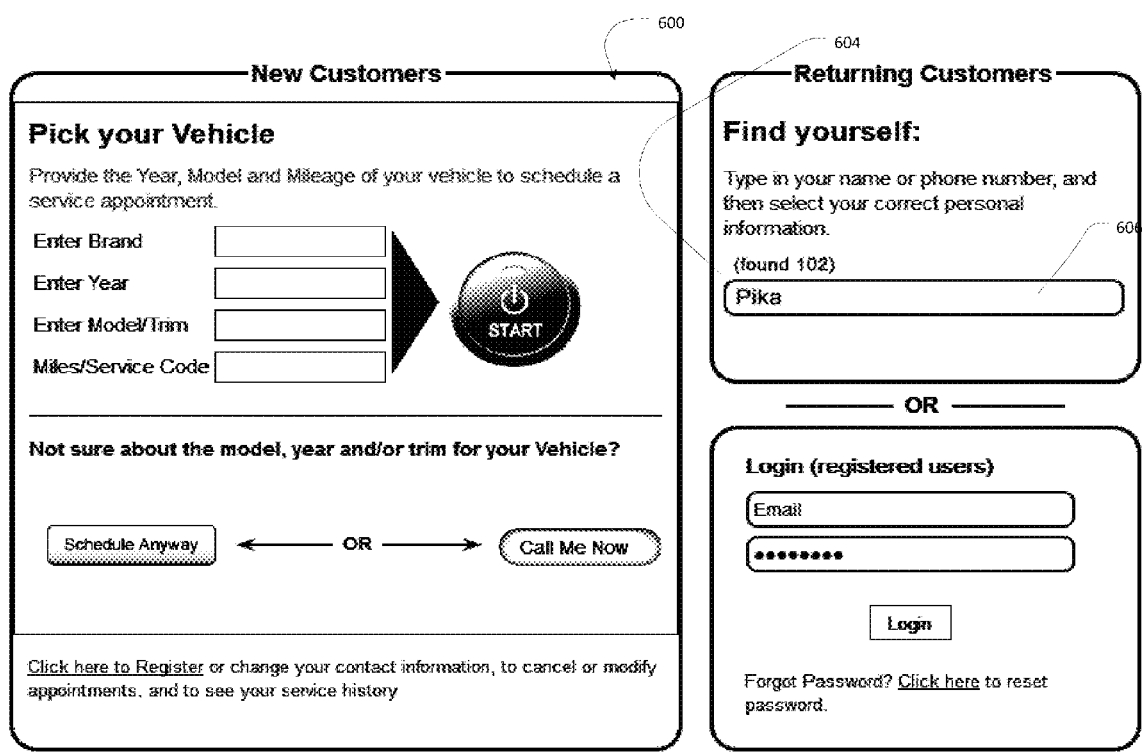
FIG. 6 shows an embodiment with an online application interface, where the user identification information (email address) is being input but prior to a threshold for the defined maximum number of choices is low enough for display to the user.

In this embodiment, the basic authentication level allows the user to schedule a service appointment with a minimal amount of keystrokes and reveals only obscured personal information for selecting the identity (FIG. 6, FIG. 7), and the make/model of the previously registered vehicle intended for the service appointment. Similarly, when confirming the appointment, only obscured personal information is shown to the user (FIG. 8). An alternate version of this embodiment provides a higher level of privacy, the "instant access" or "find yourself" field of the online application requiring the user to input lesser known personal information, such as the vehicle VIN (FIG. 6).

In other embodiments, these different levels of privacy/security provided for the partitioned user levels (the basic level, in the previous embodiment) can be extended to many levels of protection while maintaining the very simple and rapid usage and eliminating traditional password entry. These various levels, from basic upwards, utilize increasingly esoteric personal information which would be known at the highest level to only the intended user.

An additional dimension of security in other embodiments of the invention may be provided by requiring additional challenge-response information entry in the same manner as the first "find me" field information entry. For example, the initial challenge response asks for entry of one the user's identifying information from the choice of, for example, vehicle license plate or driver's license number, and a second information challenge-response asks for the other information from the same set.

In another embodiment, a CAPTCHA challenge-response mechanism is employed to eliminate robot access employed either for data mining or malicious purposes. As with the above embodiments, no entry, storage or transmission of the user's traditional username or password is needed for security levels employing the invention.

In these and other embodiments, the information needed for the challenge-response identity queries, as well as the obscuring of information reflected in the identity choices presented to the user, are configurable by the user and/or the online application administration. Thus the safeguards for user information privacy and safeguards for sensitive information are fully configurable according to individual needs.

In other embodiments, customer data sources other than from registered accounts are aggregated into a single index. Users identified as customers, but without registered accounts may be given an opportunity for automatic registration. In still other embodiments, no online accounts are used and customers are authenticated with one of the described embodiments and allowed to substantively without any account registration, by the utilization of known customer detailed information.

Figure 1:
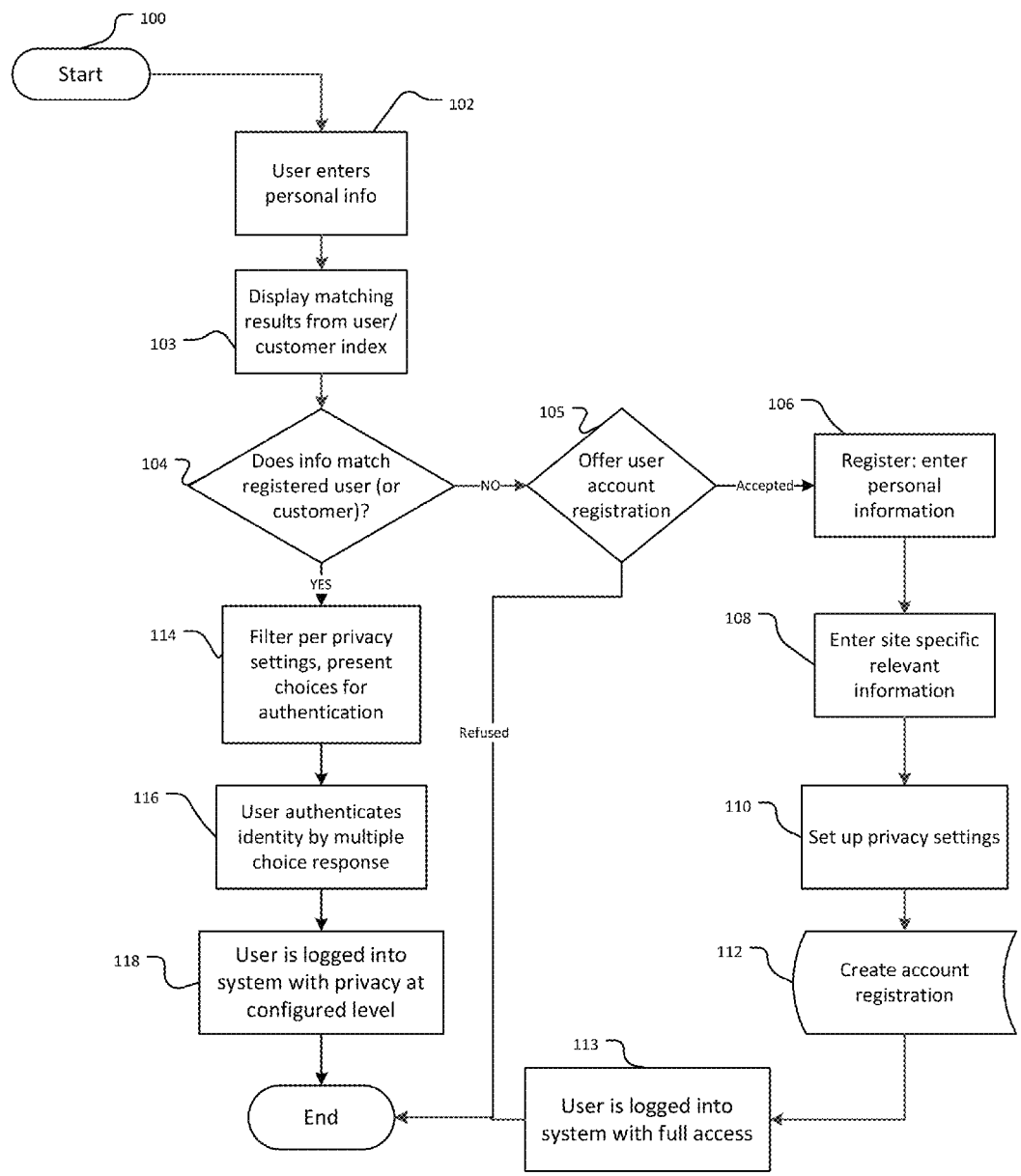
FIG. 1 shows a flow chart depicting an embodiment for a basic "no password" login, allowing the user basic privileges without revealing or reflecting any personal or private information back to the user. In this embodiment, users may choose to register an account or not, but in both cases may proceed according to the chosen identity.

FIG. 1 depicts a flowchart outlining a typical implementation of the invention. Initially 100, a user may not recall if they are registered or a customer, and simply begins using the "instant access" or "find yourself" personal information input 102. The system then displays the matching registered user records or indexed unregistered customers 103 (in obscured form) from which the user may or may not find an identifying record 104. If the user is not registered (or a customer), they may optionally 105 begin the registration process 106 by entering personal information. In various embodiments, the user may also enter site specific information (such as license plate numbers and vehicle make and model for the automobile service appointment exemplary model) 108. They may optionally then configure privacy settings regarding reflected information and communication with the user 110. In various embodiments the information is stored and indexed securely on only the remote server 112. In these embodiments, users are provided full access after optionally registering. 113

In this embodiment, as data is entered into the field 102, the application continuously searches the indexed customer data for matching records 104 utilizing a database management system (defined as being inclusive of an operable database), and when limited to a number of records below a threshold value of records, the application filters and obscures information from the records such that they become unrecognizable to anyone other than the identified user 114. The user then selects the correct choice from the list, authenticating and identifying themselves with just a few keystrokes and a single click 116. The user is then logged into the application at the partitioned "basic" level, wherein no personal information is reflected back to the user 118. As previously mentioned, this knowledge based challenge-response pairing may be as simple as providing a user's real name, email, or phone number (FIG. 6), or be limited to far more esoteric identity information, such as a license plate or driver's license number, or the last 4 digits of the user's Social Security Number.

Figure 2:
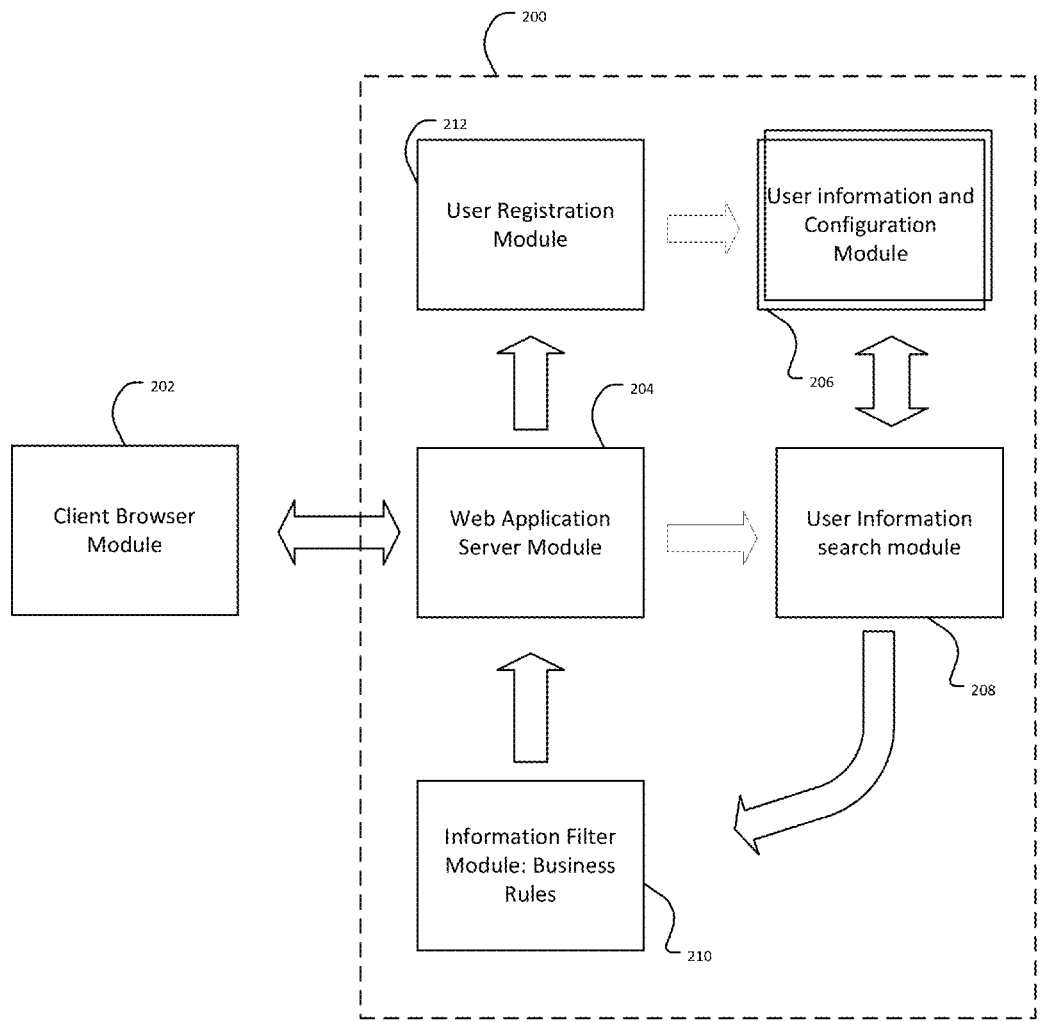
FIG. 2 shows a block diagram depicting the component modules of a basic embodiment.

FIG. 2 depicts an exemplary component breakdown for the system. Shown is the application and database server 200, and the client browser 202, which acts as the user interface host. The server 200 components include a module executing the application servlet 204, such as Apache Tomcat for executing Java or Java Server Pages, a database of indexed user information, privacy and administration business rules 206, a search module for searching this database 208, and a module implementing the information redaction and challenge-response business rules 210. Also included is a user registration module which populates the database 208 with the user's personal and site relevant information 212.

Figure 2A:
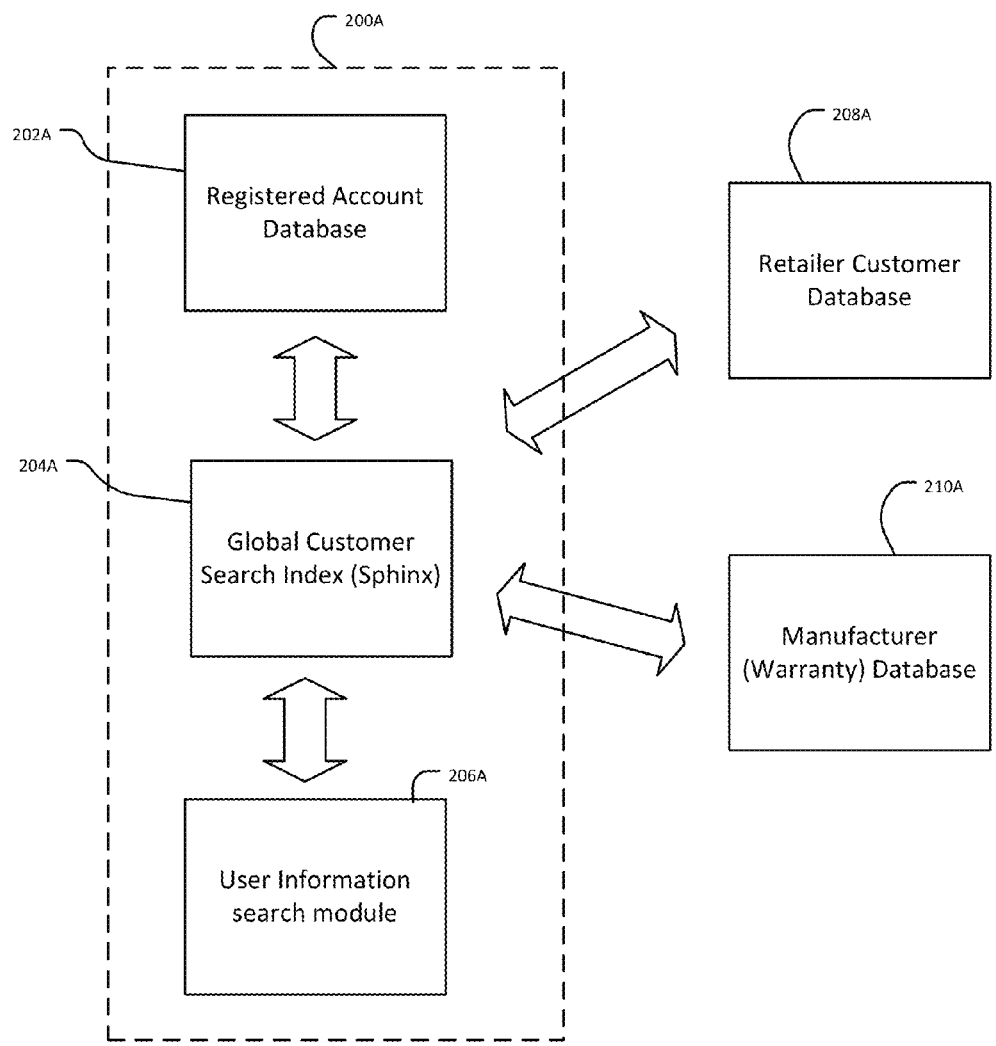
FIG. 2A shows a block diagram depicting the component modules of an embodiment which includes incorporation of customer identification resources from multiple sources.

FIG. 2A depicts an exemplary embodiment which incorporates customer database information in addition to registered users 202A. The local system 200A consists of an indexing system and database 204A which queries registered user data 202A, and external customer databases such as compiled retailer customer data 208A and manufacturer customer data 210A that may have been compiled from warranty registration information. Specialized indexing systems such as Sphinx 204A are designed for efficient real time searches 206A.

Figure 3:
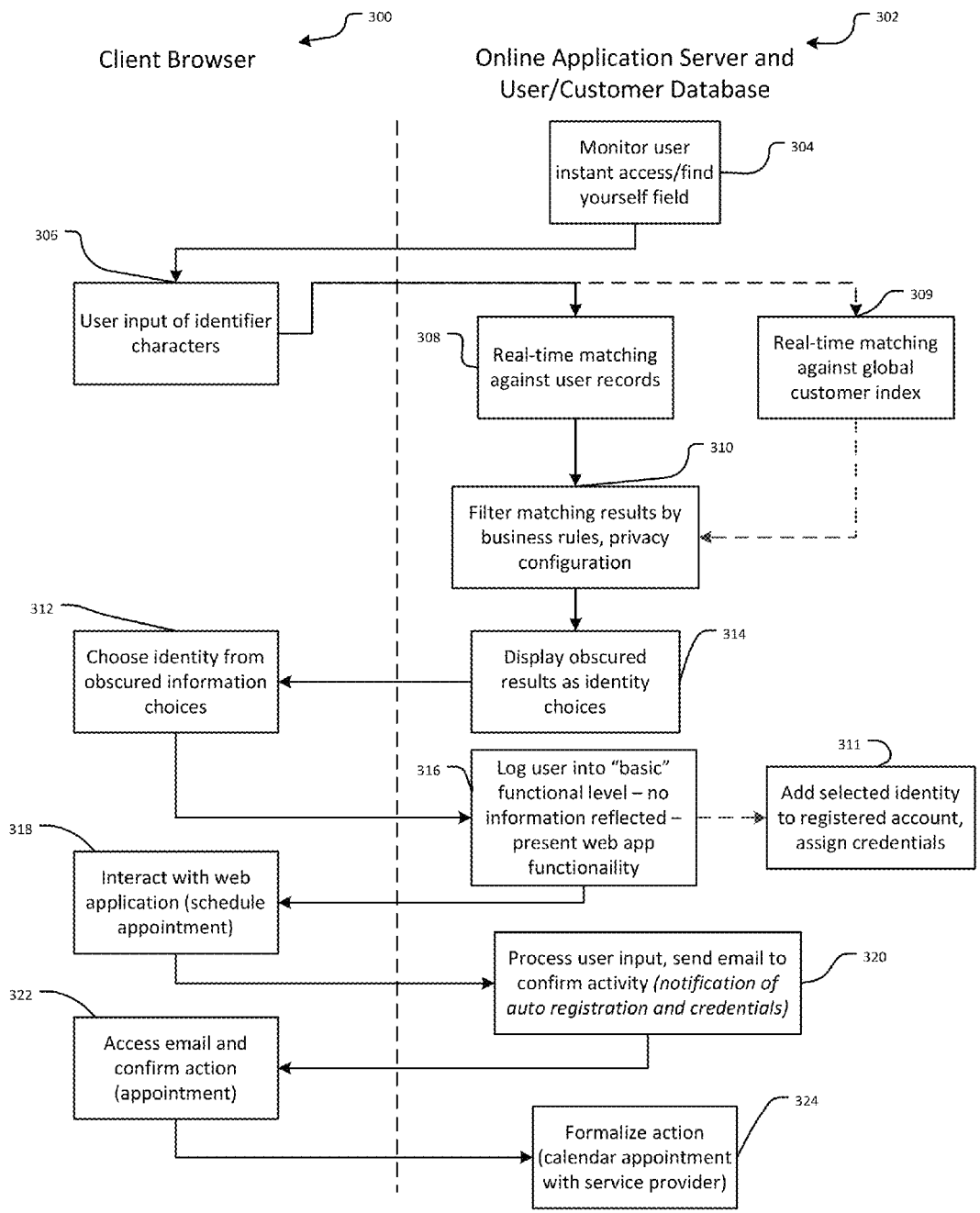
FIG. 3 shows a flow chart depicting an embodiment of the detailed process of interaction between the client browser, application server, and user information and configuration database. An embodiment which incorporates identification of unregistered identities and automated registration is also shown.

FIG. 3 details the interaction between the client browser 300 and the application server 302. For registered users or other indexed customers, the process begins with the continuous real-time monitoring of the "instant access" or "find yourself" field 304. Users input digits or characters corresponding to the requested identifying information 306, and in real-time, the application matches the input against user records 308 or indexed non-registered customer data 309, according to configured challenge-response business rules and privacy settings 310. Records matching the input are filtered and obscured 310 and displayed to the user as identity choices 314. Clicking on the appropriate choice of identity logs the user into the basic operation level for that account 316, allowing that user to perform limited functions or retrieve limited information 318. Prior to acting upon a user records or affirmative acting in the name of the identified user 324, the application may send the user an email for secondary confirmation 320, 322. In various embodiments unregistered customers identified by the user are auto-registered 311 and the customer is sent login credentials by email for confirmation and later authenticated use 320.

Figure 3A:
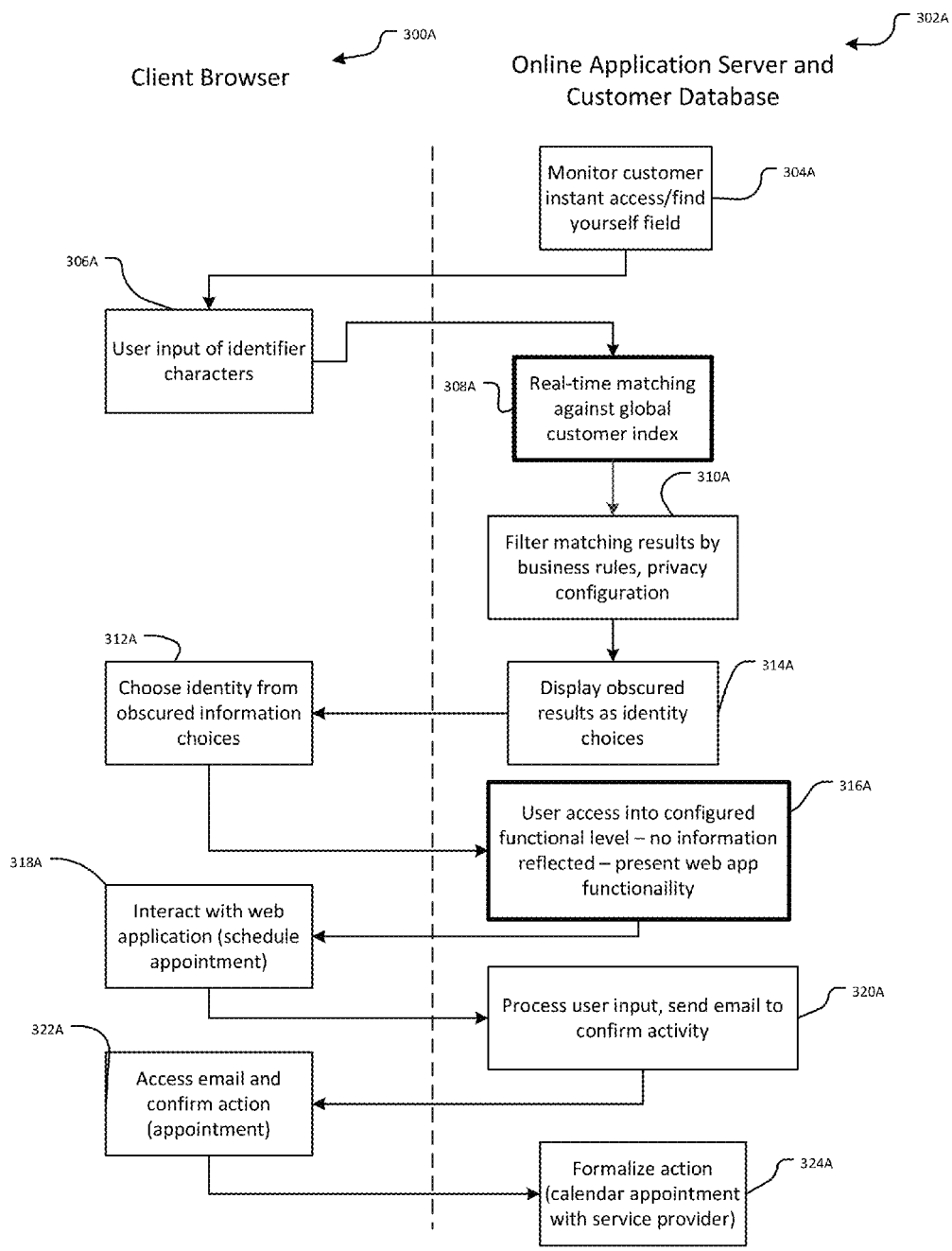
FIG. 3A shows an embodiment for authenticated user interaction without creating an account for the user.

FIG. 3A depicts an embodiment providing users an identified access to system capabilities (making an appointment, checking delivery status, etc.) without any account registration of users or customers. In this embodiment, the process steps split between the client browser 300A and the application server 302A are a subset of the steps from the process as depicted in the embodiment from FIG. 3. After monitoring 304A user input 306A this embodiment only matches user input against the indexed customer information 308A. Filtering of matching results 310A, display of the obscured matches 314A, and user selection 312A are the same as in FIG. 3. In this embodiment, self-identified users are provided access according to the configuration without any account login 316A. The remaining process steps 318A-324A are analogous to the account based process in FIG. 3, and the embodiment here is also for making a service appointment 324A.

Figure 4:
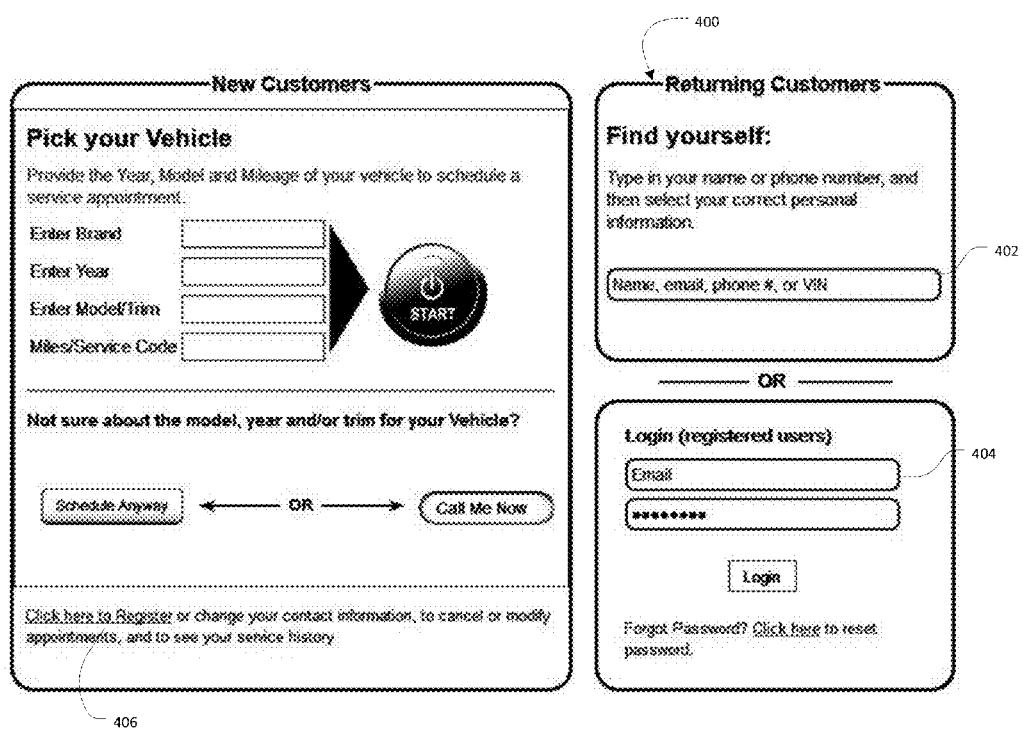
FIG. 4 shows an embodiment with an online application browser interface which includes the "find yourself" or "instant access" user input field for initiating the "no password" login.

FIG. 4 depicts an exemplary embodiment of the invention as an application interface 400. Shown is the "instant access" or "find yourself" field 402, a mechanism for logging in with a traditional username/password pair 404, and a link to the registration interface 406. In this embodiment of the invention, the user is allowed to use name, email, phone number, or vehicle identification number ("VIN"), as the identifying information used for access 402.

Figure 5:
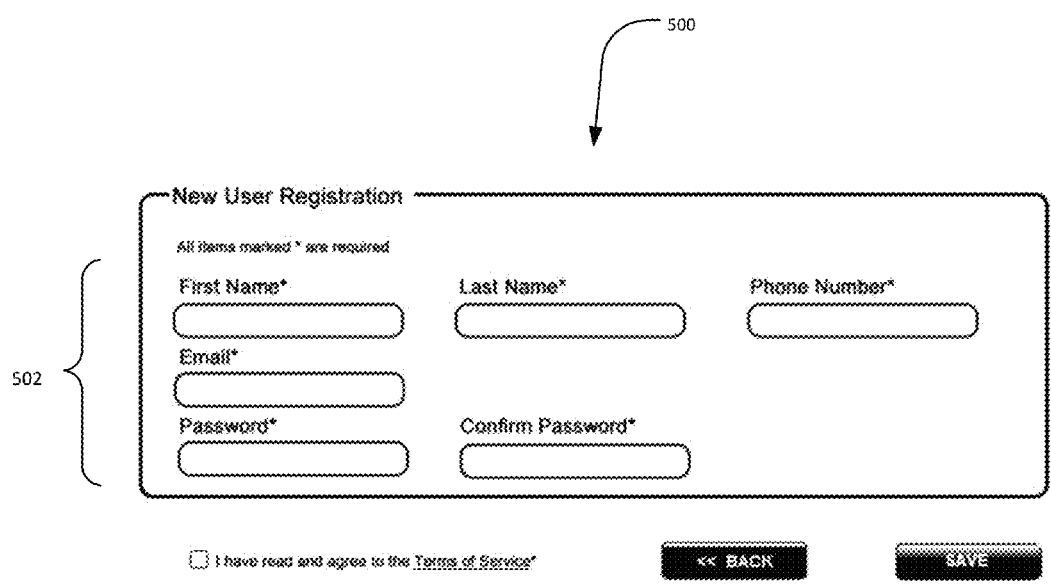
FIG. 5 shows an embodiment with an online application browser interface for user information registration.

FIG. 5 shows the registration interface used in this exemplary embodiment of the invention 500. User personal information is 502 is input by the user through this interface. Other embodiments provide the user the ability to configure privacy, communication, and an unlimited variety of personal information relevant to the function of the customer interaction.

FIG. 6 depicts the application interface 600 for the exemplary embodiment during the real time challenge-response identification matching process. Shown in the "find yourself" or "instant access" field 606 is the user input of a partial name (the characters "Pika"), and the real-time number of matching records ("found 102" 604) which exceeds the (configurable) threshold for presenting obscured choices to the user.

Figure 7:
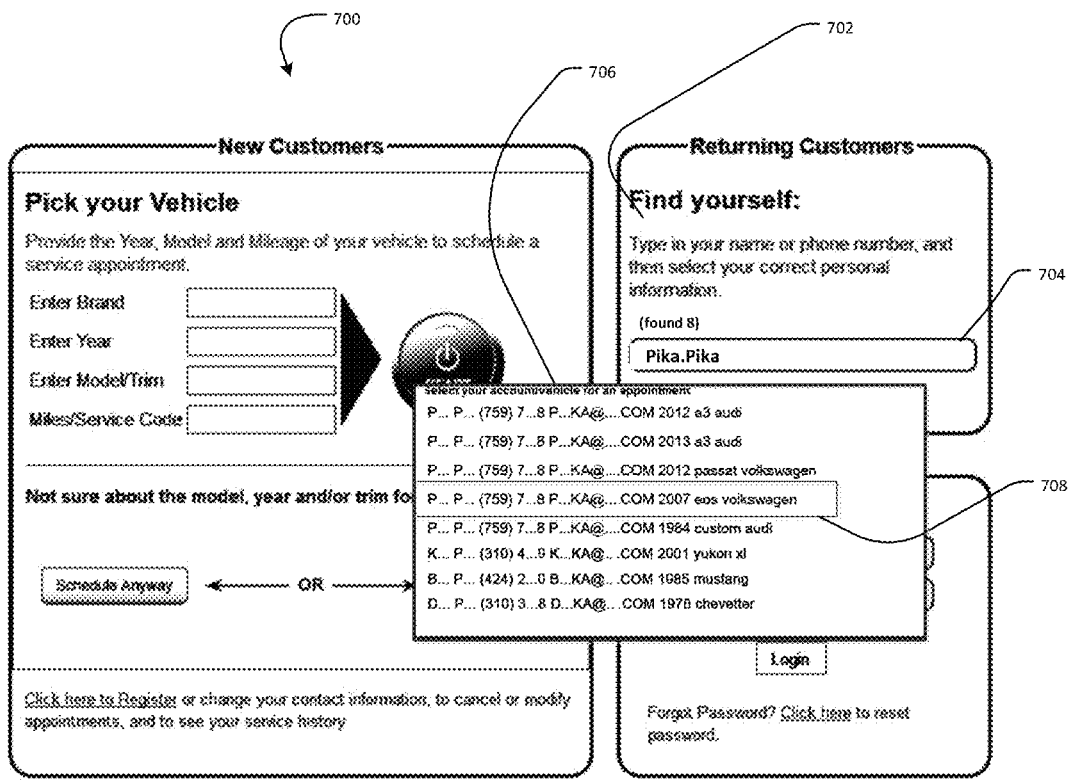
FIG. 7 shows an online application interface, where the user identification information (email) is being input and identity choices available from the user information database. Identity choices available from the user information index are presented with personal identifying information obscured for privacy and security. In this embodiment, users with multiple true identifications (i.e. an individual with different cars, email accounts, etc.) may select the relevant choice among their own identified information.
Figure 8:
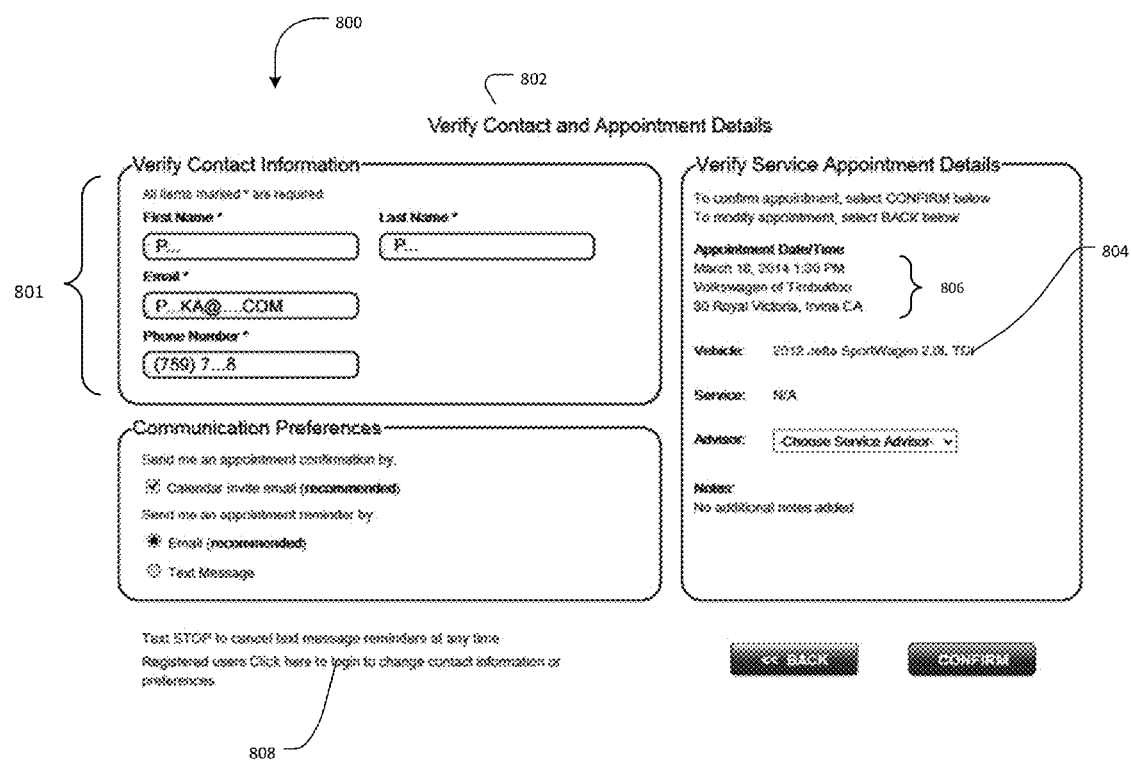
FIG. 8 shows an online application interface depicting a confirmation or verification screen after a "no password" login user including the result of the user interaction (appointment date/time) but obscuring the personal identifying information.

FIG. 7 depicts the application interface for the exemplary embodiment of the invention 700 during the real time challenge-response identification matching process. Shown in the "find yourself" or "instant access" field 704 is the user input of a partial email address (the characters "Pika.Pika"), and the real-time obscured presentation 706 of matching records ("found 8" 702) from which the user is to choose their identity. In this embodiment, the user is presented with multiple entries for the same customer, but with additional information (the customer vehicle) from which to choose an account or particular customer product to process (make a service appointment) 708. If this implementation had been configured limiting the user input identity choices to a vehicle license plate, this would certainly be more esoteric information and would provide a higher level of access restriction or control.

In various embodiments, once the user identifies himself or herself, various actions may be performed. In the exemplary embodiment, a customer's vehicle is scheduled for service. In various embodiments, the user can choose a particular service advisor, discounted service times, shuttle service, and describe their service needs. In these embodiments, user personal information remains obscured.

In various embodiments, including the exemplar appointment scheduling system, as shown in FIG. 8 is the appointment confirmation user interface screen 800. In this embodiment of the invention, the user must confirm the appointment time and date 806, along with the vehicle 804 and obscured personal information 902. If the user recognizes error in the personal information or communication preferences, they may login to the higher security level access through a traditional username and password 908. Additional security may be provided at this level by requiring the user to respond to a secondary confirmation email before the appointment is actually calendared by the service entity.

In other embodiments of the invention, the application is utilized to make restaurant reservations, salon appointments, or schedule country club golf tee times. In another embodiment of the invention, the application provides package tracking information without reflecting the delivery address or sender information. In another embodiment of the invention, the user requests renewals of library materials. In other embodiments of the invention employing the additional security of enhanced and multiple identity challenge-response pairs, the user makes routine optometrist, doctor, dentist, or dental hygienist appointments. All of the above embodiments can also be utilized to review upcoming appointment times in redacted form or with an additional intermediary partitioned access level higher than basic, but not with the full user credentials.

In other embodiments of the invention, the user can access delivery status information, make personal appointments, cancel newspaper or mail delivery during vacations, use online fantasy sports or other gaming sites. In various embodiments, the user may be permitted to participate in game play with or without their game identity redacted, or the user activities may by more limited, depending on user configurable settings, or the games administrative business model.

The implications of the present invention's numerous potential configurations and embodiments are far reaching. Numerous routine and benign online activities which currently require traditional username/password authentication are now available without any of the well documented security risks posed by the proliferation of password usage. By providing users an acceptably and extremely convenient alternative to the traditional model, benefits accrue for the user's security with unaffiliated third party sites, since they are less likely to have password duplication vulnerability. Embodiment variations which provide user authentication and interaction without any user accounts are any even further departure from tradition cumbersome and vulnerable user/password authentication and has countless applications.

Although the invention has been described in terms of the preferred and exemplary embodiments, one skilled in the art will recognize many embodiments not mentioned here by the discussion and drawing of the invention. Interpretation should not be limited to those embodiments specifically described in this specification.

The Commissioner is hereby authorized to charge any fees which may be required with respect to this application to Deposit Account No. 505949.

We claim:

1. A system for authenticating identity comprising:
   a central server computing device configured to store identification information, utilizing a database management system, wherein the identification information comprises one or more items of information associated with one or more identities, wherein the computing device is configured to receive input data from a user interface as a series of alphanumeric characters;

a database management system configured to search for entries wherein at least a portion of the entry matches the series of received alphanumeric characters, wherein if the number of the matching entries is less than a configurable threshold value, then the computing device is configured to present a list of the matching entries to the user interface, wherein the list of matching entries are filtered according to configurable rules obscuring at least a portion of individual matching entries from which allows a user to select their own identity using the user interface;

whereby the system authenticates the user when the user selects their own identity, wherein the authentication provides configurable limited services.

2. A system as in claim 1, wherein the database management system is configured to index identification information received from a database of registered users.

3. A system as in claim 1, wherein the database management system is configured to index identification information received from a customer database.

4. A system as in claim 1, wherein the database management system is configured to index identification information received from a database of registered users and a customer database.

5. A system as in claim 1, wherein the database management system is configured to index identification information received from a database of registered users and a customer database, and to register authenticated user identities for services.

6. A system as in claim 1, wherein the database management system is configured to index identification information received from a database of registered users and a customer database, registering authenticated user identities for online services, assigning credentials to the registered user identities, and communicating those credentials to the users.

7. A system as in claim 1, wherein a plurality of authentication levels are associated with a corresponding plurality of identification information levels' for which authentication of increasingly esoteric information is associated with increased authentication trust and increased information reflected to the authenticated user.

8. A method for authenticating identity comprising:
storing identification information on a computing system database management system, wherein the identification information comprises one or more items of information associated with one or more identities;
receiving user identifying data on a computing system, the user identifying data comprising a series of alphanumeric characters input from a user interface;
searching for matching entries with the database management system as the series of alphanumeric characters is received, wherein at least a portion of each identified matching entry matches the series of characters;
determining the number of matching entries;
comparing the number of matching entries against a configurable threshold value;
filtering the matching entries according with a configurable set of rules to obscure at least a portion of each of the matching entries, when the number of matching entries is less than the threshold value;
sending the filtered matching entries to the user interface;
receiving input from the user interface identifying the a user selection for authentication;
whereby the user is authenticated for limited purposes by presenting the user with obscured information matching the input from which the user selects the entry matching their identity.

9. A method as in claim 8, wherein the database management system is configured to index identification information received from a database of registered users.

10. A method as in claim 8, wherein the database management system is configured to index identification information received from a customer database.

11. A method as in claim 8, wherein the database management system is configured to index identification information received from a database of registered users and a customer database.

12. A method as in claim 8, wherein the database management system is configured to index identification information received from a database of registered users and a customer database, and to register authenticated user identities for services.

13. A method as in claim 8, wherein the database management system is configured to index identification information received from a database of registered users and a customer database, registering authenticated user identities for online services, assigning credentials to the registered user identities, and communicating those credentials to the users.

14. A method as in claim 8, wherein a plurality of authentication levels are associated with a corresponding plurality of identification information levels' for which authentication of increasingly esoteric information is associated with increased authentication trust and increased information reflected to the authenticated user.

15. Non-transitory computer readable media comprising computer instructions executed by a computing device, the instructions comprising:
instructions for storing identification information on a computing system database management system, wherein the identification information comprises one or more items of information associated with one or more identities;
instructions for receiving user identifying data on a computing system, the user identifying data comprising a series of alphanumeric characters input from a user interface;
instructions for searching for matching entries in the database management system as the series of alphanumeric characters is received;
instructions for determining the number of matching entries;
instructions for comparing the number of matching entries against a configurable threshold value;
instructions for filtering the matching entries according to a configurable set of rules to obscure at least a portion of the matching entries, when the number of matching entries is below the threshold value;
instructions for sending the filtered matching entries to the user interface;
instructions for receiving input from the user interface identifying the a user selection for authentication;
whereby the user is authenticated for limited purposes by presenting the user with obscured information matching the input from which the user selects the entry matching their identity.

16. Non-transitory computer readable media as in claim 15, wherein the database management system is configured to index identification information received from a database of registered users.

17. Non-transitory computer readable media as in claim 15, wherein the database management system is configured to index identification information received from a customer database.

18. Non-transitory computer readable media as in claim 15, wherein the database management system is configured to index identification information received from a database of registered users and a customer database.

19. Non-transitory computer readable media as in claim 15, wherein the database management system is configured to index identification information received from a database of registered users and a customer database, and to register authenticated user identities for services.

20. Non-transitory computer readable media as in claim 15, wherein the database management system is configured to index identification information received from a database of registered users and a customer database, registering authenticated user identities for online services, assigning credentials to the registered user identities, and communicating those credentials to the users.

\* \* \* \* \*